(12) United States Patent
Sugahara

(10) Patent No.: US 7,497,960 B2
(45) Date of Patent: Mar. 3, 2009

(54) METHOD FOR MANUFACTURING A FILTER

(75) Inventor: Hiroto Sugahara, Aichi-ken (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 180 days.

(21) Appl. No.: 11/262,634

(22) Filed: Oct. 31, 2005

(65) Prior Publication Data

US 2006/0091069 A1    May 4, 2006

(30) Foreign Application Priority Data

Oct. 29, 2004    (JP) .............................. 2004-315223

(51) Int. Cl.
*H01B 13/00*    (2006.01)

(52) U.S. Cl. .............................. 216/17; 216/27; 216/39; 216/74; 216/96

(58) Field of Classification Search .................. 216/17, 216/27, 39, 74, 96
See application file for complete search history.

(56) References Cited

U.S. PATENT DOCUMENTS

| | | | |
|---|---|---|---|
| 5,124,717 A | | 6/1992 | Campanelli et al. |
| 5,194,200 A | * | 3/1993 | Anderson et al. ......... 210/510.1 |
| 5,728,244 A | * | 3/1998 | Nanataki et al. ......... 156/89.11 |
| 5,753,014 A | | 5/1998 | Van Rijn |
| 5,958,165 A | * | 9/1999 | Takeuchi et al. ......... 156/89.11 |
| 6,254,229 B1 | | 7/2001 | Bohorquez et al. |
| 6,461,524 B1 | * | 10/2002 | Tsuihiji et al. .............. 210/777 |
| 2001/0019029 A1 | * | 9/2001 | Tai et al. ..................... 210/506 |
| 2004/0137209 A1 | * | 7/2004 | Zeller et al. .............. 428/304.4 |
| 2004/0154972 A1 | * | 8/2004 | Cho et al. .............. 210/321.84 |
| 2004/0179057 A1 | | 9/2004 | Yamada |
| 2005/0042743 A1 | * | 2/2005 | Kawai et al. ............. 435/287.2 |
| 2005/0092676 A1 | * | 5/2005 | Dalton et al. .......... 210/500.26 |

FOREIGN PATENT DOCUMENTS

| | | |
|---|---|---|
| EP | 0924078 | 6/1999 |
| JP | 2003166077 | 6/2003 |

OTHER PUBLICATIONS

Wikipedia, The free Encyclopedia, Silicon nitride, http://en.wikipedia.org/wiki/Silicon_nitride ; pp. 1-2; 2007.*
Dictionary definition for the term "on" via http://dictionary.reference.com/browse/on ; 2007.*

* cited by examiner

*Primary Examiner*—Binh X Tran
(74) *Attorney, Agent, or Firm*—Reed Smith LLP

(57) ABSTRACT

A method for manufacturing a filter is provided which can easily manufacture the filter that has both excellent anti-corrosion properties and anti-abrasion properties. In the method, a first substrate is produced that has a plurality of holes, a ceramic layer will be formed by depositing extremely small particles of ceramic material on one side of the first substrate, and a filter having a plurality of holes will be obtained. The manufactured filter is composed of ceramic material, and has excellent anti-abrasion and anti-corrosion properties.

11 Claims, 7 Drawing Sheets

Scanning Direction
Sheet Feed Direction

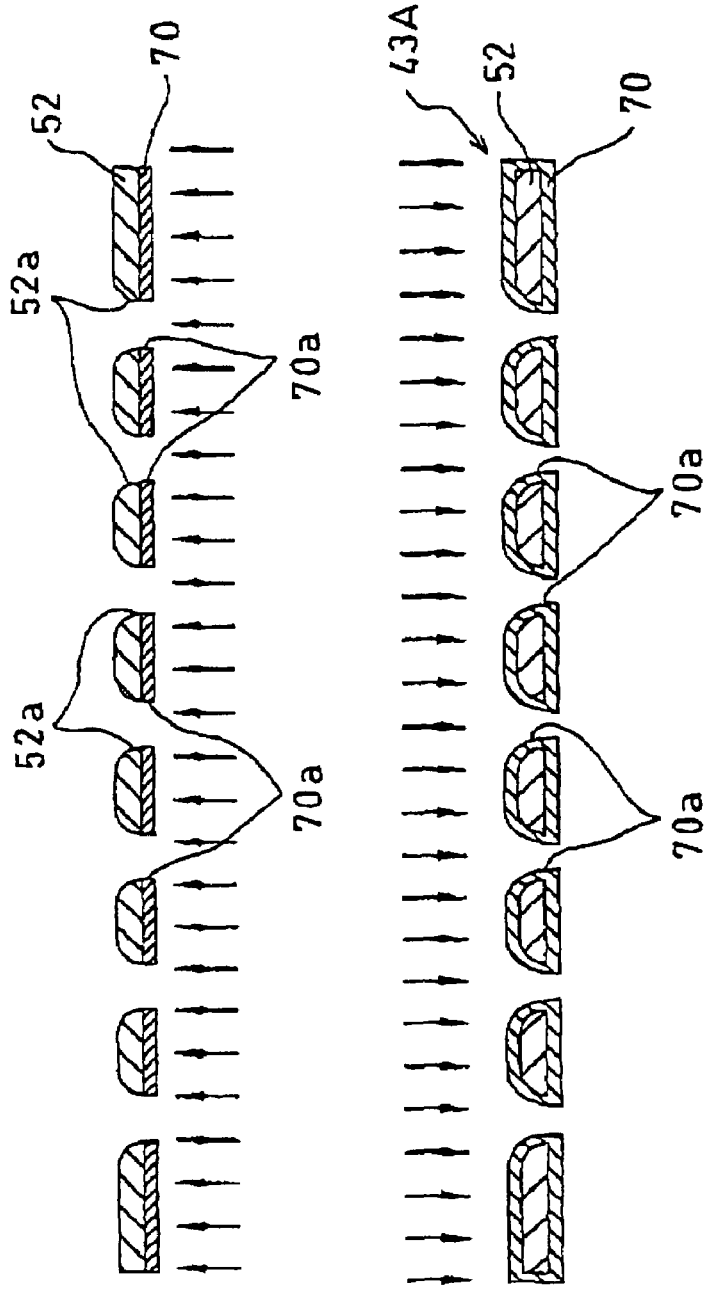

METHOD FOR MANUFACTURING A FILTER

CROSS-REFERENCE TO RELATED APPLICATION

The present application claims priority to Japanese Patent Application No. 2004-315223 filed on Oct. 29, 2004, the contents of which are hereby incorporated by reference into this application.

BACKGROUND OF THE INVENTION

1. Field of the Invention

The present invention relates to a method for manufacturing a filter that removes dust contained in a fluid. In particular, the present invention relates to a method for manufacturing a filter for removing dust contained in a corrosive fluid such as ink or the like, that has excellent anti-abrasion properties and anti-corrosion properties.

2. Description of the Related Art

For the purpose of removing dust contained in a fluid, filters having a plurality of holes which allow the fluid to pass therethrough but do not allow dust to pass therethrough are widely used in various fields. For example, an ink jet head that ejects ink from nozzles generally has a filter having holes whose diameters are smaller than the nozzle diameters, in order to prevent dust from clogging the nozzles and ink no longer being able to be discharged therefrom (for example, FIG. 1 of Japanese Laid-Open Patent Application Publication No. 2004-268454). The filter of Japanese Laid-Open Patent Application Publication No. 2004-268454 is formed by electrotyping. In other words, after forming a resist pattern that corresponds to a plurality of holes at a surface of a conductive substrate, a metal such as nickel, copper, or the like is deposited by electro deposition method to form a thin metal layer on the portions of the substrate in which the resist pattern is not formed, and then the substrate is removed from the metal layer to obtain a filter.

BRIEF SUMMARY OF THE INVENTION

However, when the filter is formed by electrotyping, the material of the filter is limited to metals such as nickel, copper, or the like that have poor anti-corrosion properties. Because of that, when the filter is arranged in a corrosive fluid such as ink or the like, problems will occur in which the diameters of the holes in the filter will gradually enlarge due to corrosion, and the dust removal function of the filter will decline, and thus the life of the filter will be shortened. In addition, problems will occur in which the diameters of the holes in the filter will gradually enlarge due to abrasion that occurs when a fluid such as ink or the like passes therethrough, the dust removal function of the filter will decline, and thus the life of the filter will be shortened.

The shortening of the life of the filter that accompanies the corrosion and abrasion will be identical with filters composed of a synthetic resin material. By forming holes with a laser process in a substrate composed of a synthetic resin, it will be possible to manufacture a filter having microscopic holes. However, because synthetic resin has poor anti-corrosion properties and anti-abrasion properties, the holes in the filter will gradually enlarge due to the abrasion that occurs when ink passes therethrough or due to the corrosion caused by ink, and thus the life of the filter will be shortened.

It is generally possible to form a filter composed of a metal having good anti-corrosion properties and anti-abrasion properties by methods other than electrotyping. However, it is generally difficult to process this type of metal with high-precision, and difficult to manufacture a filter having holes with small diameters that is essential in an ink jet head. For example, when forming holes in a stainless steel plate having good anti-corrosion properties with a mechanical process such as a micropunching process, drill process, or the like, it is difficult to form a plurality of holes with good precision that have diameters smaller than the diameters of the nozzles (for example, 10 μm or less).

An object of the present invention is to provide a method for manufacturing a filter having microscopic holes, that is capable of easily manufacturing the filter that has both excellent anti-corrosion properties and anti-abrasion properties.

The present invention may be embodied as a method for manufacturing a filter. The method for manufacturing a filter of the present invention includes processes of forming a first substrate having a plurality of holes, and depositing particles of ceramic material on one side of the first substrate to form a ceramic layer.

In the aforementioned method, the ceramic layer is formed on one side of the first substrate. Because a plurality of holes is arranged on the first substrate, the ceramic layer formed in the aforementioned method has a plurality of holes that are identical with the first substrate. This ceramic layer can be used as a filter.

When ceramic is employed as a filter for a corrosive fluid such as ink or the like, it will be difficult for corrosion to occur because the anti-corrosion properties of the ceramic are high, and it will be difficult for the diameters of the holes to become enlarged. In addition, even if a fluid such as ink or the like passes through the filter, it will be difficult for the diameters of the holes to become enlarged because the anti-abrasion properties of the ceramic are good. In other words, it will be difficult for the dust removal function of the filter to decline, and thus a filter having a long life can be manufactured.

Because ceramics have a high degree of hardness, it is difficult to form microscopic holes with good precision in a ceramic plate by a mechanical process. However, in the aforementioned method for manufacturing a filter, by forming a ceramic layer on the first substrate having a plurality of holes, a ceramic layer that has a plurality of holes can be obtained formed with good precision.

BRIEF DESCRIPTION OF THE DRAWINGS

FIG. 5 (b) shows electro deposition to form a first substrate according to the embodiment of the method for manufacturing the filter.

FIG. 5 (c) shows removing the second substrate according to the embodiment of the method for manufacturing the filter.

FIG. 5 (d) shows forming the ceramic layer according to the embodiment of the method for manufacturing the filter.

FIG. 5 (e) shows removing the first substrate according to the embodiment of the method for manufacturing the filter.

FIG. 6 (a) shows forming the ceramic layer on one side of the first substrate according to a modified embodiment of the method for manufacturing a filter.

FIG. 6 (b) shows forming the ceramic layer on the other side of the first substrate according to the modified embodiment of the method for manufacturing the filter.

FIG. 7 (b) shows etching according to the another modified embodiment of the method for manufacturing the filter.

FIG. 7 (c) shows removing the mask according to the another modified embodiment of the method for manufacturing the filter.

DETAILED DESCRIPTION OF THE INVENTION

One embodiment of the invention will be described with reference to the figures. The present embodiment is an example in which the present invention is practiced to manufacture a filter of an ink jet head that discharges ink onto recording sheets.

Figure 1:
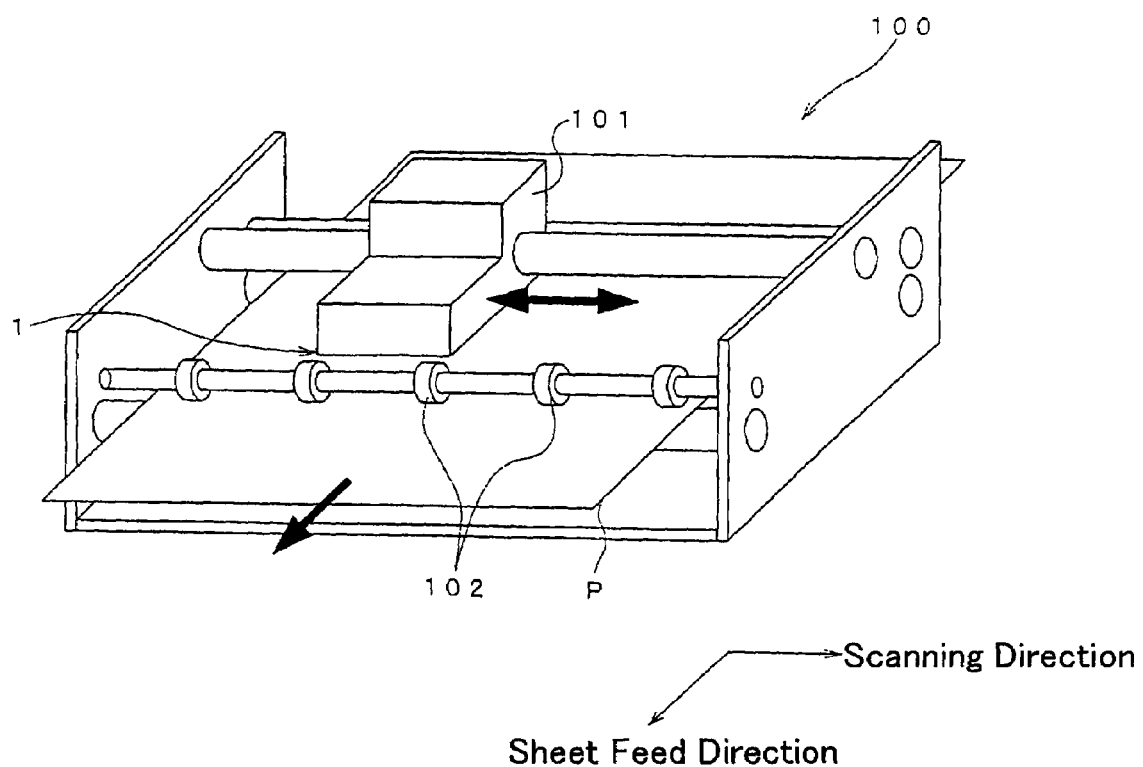
FIG. 1 is an perspective view of an ink jet printer according to an embodiment of the present invention.

First, an ink jet printer 100 will be described with reference to FIG. 1. The ink jet printer 100 has a carriage 101 capable of moving in a scanning direction (the left to right direction of FIG. 1), a serial type of ink jet head 1 that is arranged on the carriage 101 and ejects ink onto a recording sheet P, a transport roller 102 that transports the recording sheet P in a sheet feed direction (the forward direction of FIG. 1), and other items. The ink jet head 1 moves in the scanning direction together with the carriage 101, and ejects ink onto the recording sheet P from the lower surface thereof. The recording sheet P onto which ink is ejected is discharged in the sheet feed direction by means of the transport roller 102.

Figure 2:
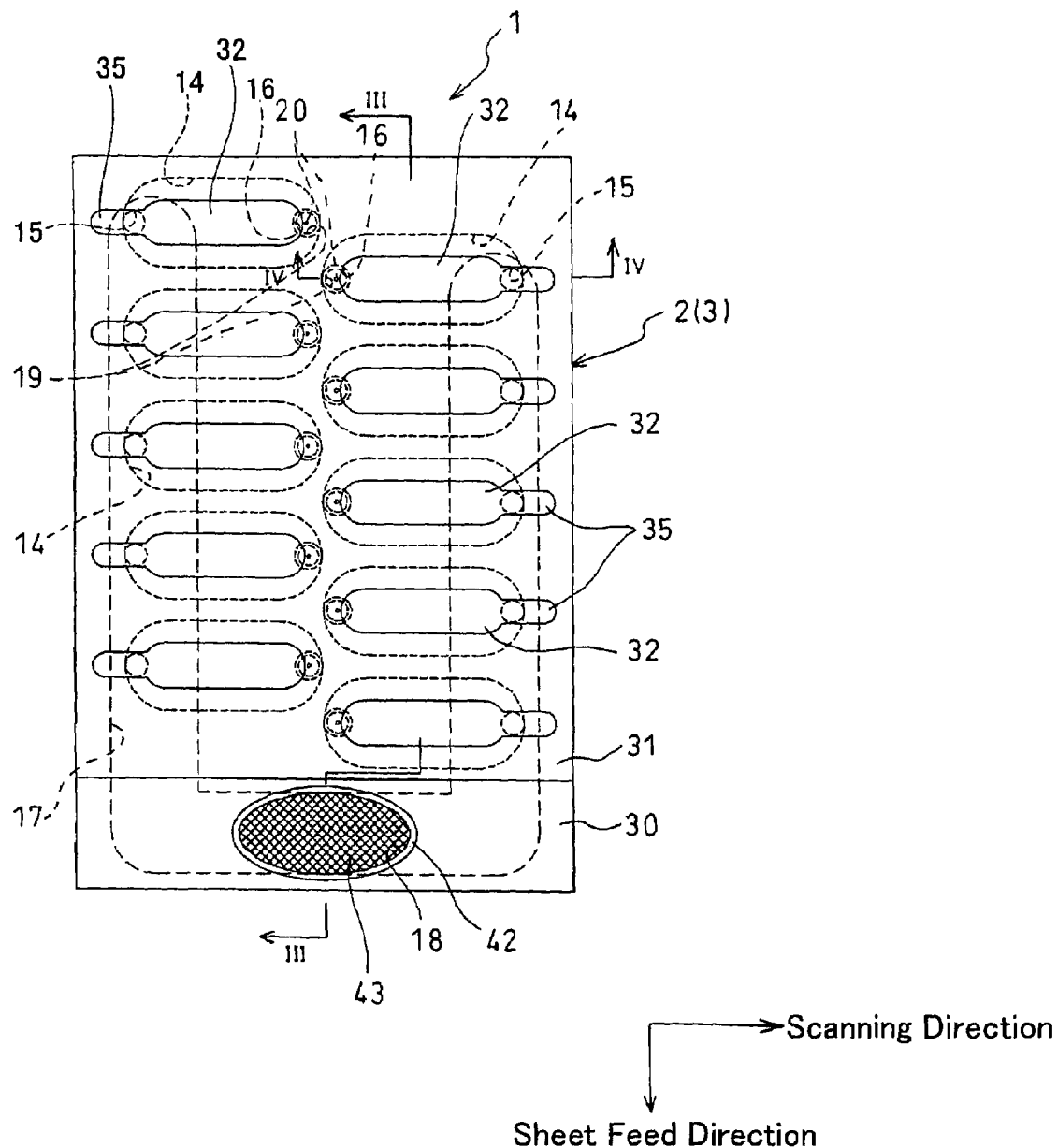
FIG. 2 is a plan view of an ink jet head viewed from above.

Next, the ink jet head 1 will be described with reference to FIGS. 2 to 4. As shown in FIG. 2, the ink jet head 1 has cylindrical connection member 42 which is connected to an ink supply tube (not shown in the figures) connected to an ink tank (not shown in the figures), a flow path unit 2 (see FIG. 3) in which ink flow paths are formed in the interior thereof, and a piezoelectric actuator 3 that is laminated on the upper portion of the flow path unit 2. The ink supplied from the connection member 42 is ejected from a plurality of nozzles 20 arranged on the lower portion of the flow path unit 2.

Figure 3:
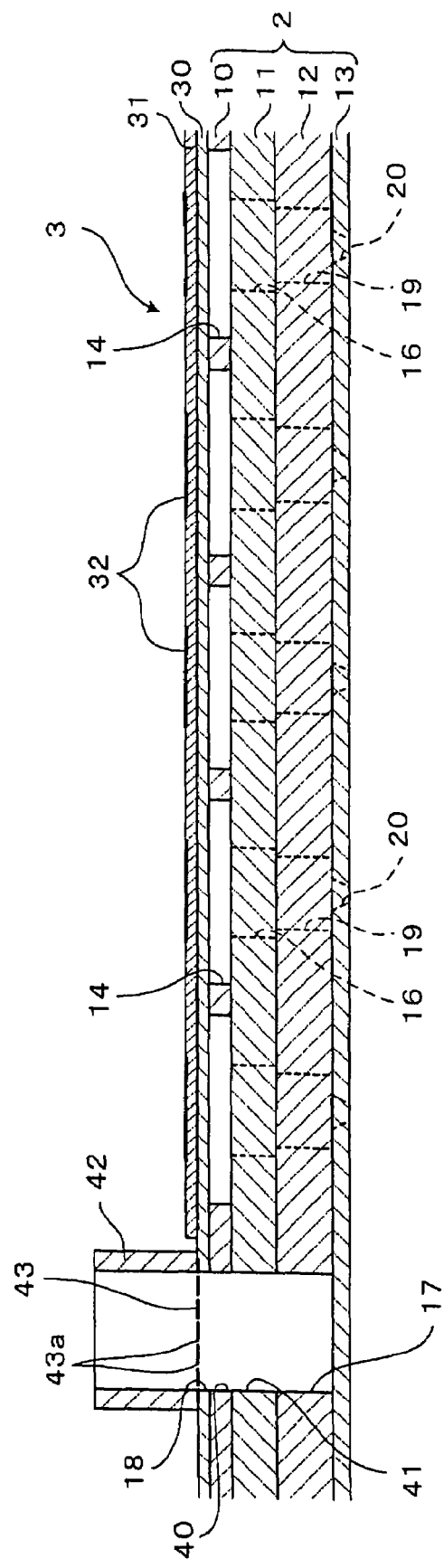
FIG. 3 is a cross-sectional view taken along III-III of FIG. 2.
Figure 4:
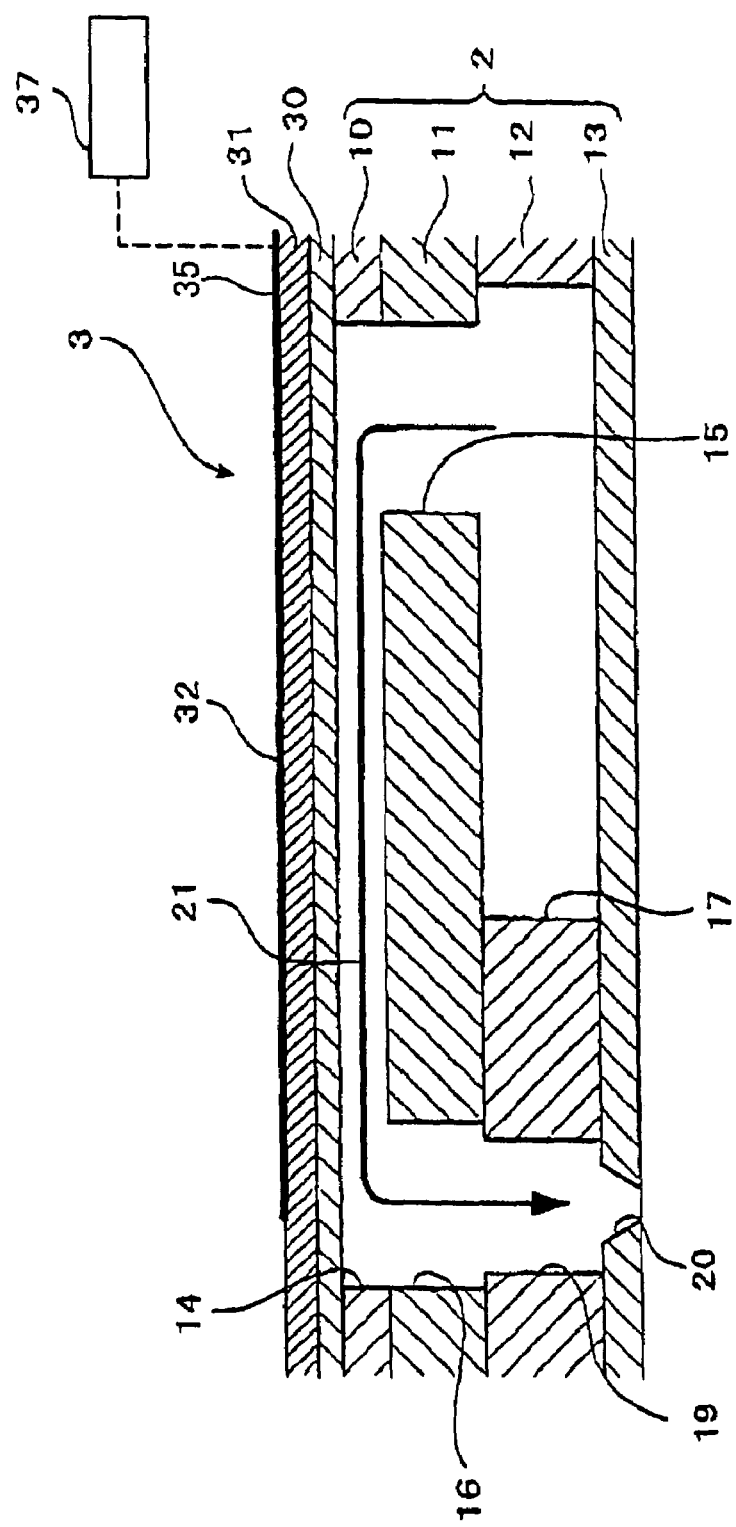
FIG. 4 is a cross-sectional view taken along IV-IV of FIG. 2.

As shown in FIGS. 3 and 4, the flow path unit 2 has a cavity plate 10, a base plate 11, a manifold plate 12, and a nozzle plate 13, and these four plates are sequentially laminated and adhered to each other from above. In addition, the piezoelectric actuator 3 has an oscillation plate 30, and the oscillation plate 30 is laminated and bonded to the upper portion of the cavity plate 10 of the flow path unit 2.

As shown in FIG. 4, the nozzle plate 13 has nozzles 20. As shown in FIG. 2, the plurality of nozzles 20 are linearly aligned in the sheet feed direction. In the present embodiment, the plurality of nozzles 20 is aligned in two rows.

As shown in FIG. 4, in the laminated state, the manifold plate 12 has communication holes 19 that respectively communicate with the corresponding nozzles 20 arranged on the nozzle plate 13. The base plate 11 has communication holes 16 that respectively communicate with the corresponding communication holes 19 in the laminated state. The cavity plate 10 has pressure chambers 14 that respectively communicate with the corresponding communication holes 16 in the laminated state.

As shown in FIG. 2, the pressure chambers 14 are substantially oval shaped and extend along the scanning direction. The pressure chambers 14 communicate with the communication holes 16 on one end thereof, and communicate with the communication holes 15 described below on the other end thereof.

As shown in FIG. 4, the base plate 11 has communication holes 15 that respectively communicate with the corresponding pressure chambers 14 in the laminated state. The manifold plate 12 has a manifold 17 that communicate with each of the plurality of communication holes 15. For each of the plurality of nozzles 20, individual ink flow paths 21 are formed inside the flow path unit 2 from the manifold 17 to the nozzles 20 via the pressure chambers 14.

As shown in FIG. 3, the oscillation plate 30 has an ink supply port 18. Ink is supplied from the connection member 42 to the ink supply port 18. The cavity plate 10 has a communication hole 40 that communicates with the ink supply port 18 in the laminated state. The base plate 11 has a communication hole 41 that communicates with the communication hole 40 in the laminated state. The manifold 17 of the manifold plate 12 communicate with the communication hole 40 in the laminated state. Ink supplied from the ink supply port 18 passes through the communication holes 40, 41 and flows into the manifold 17. Ink that has flowed into the manifold 17 will pass through each of the communication holes 15 and flow into the respective pressure chambers 14. Ink that has flowed into the respective pressure chambers 14 will pass through the communication holes 16, 19, and be supplied to the respective nozzles 20.

As shown in FIG. 3, a filter 43 composed of ceramic material such as alumina, zirconia, silicon nitride, silicon carbonate, and the like, and whose thickness is extremely thin (e.g., about 5-10 μm), is interposed between the oscillation plate 30 and the connection member 42. The filter 43 has a plurality of holes 43a through which the ink passes. The diameters of the plurality of holes 43a are smaller (e.g., about 10 μm) than the diameters of the nozzles 20 that discharge ink (e.g., about 20 μm). Because of that, dust contained in the ink supplied to the manifold 17 from the ink tank will be reliably removed by the filter 43, and will prevent dust from clogging the nozzles 20 and ink from no longer being able to be discharged from the nozzles 20.

When a metallic material or a synthetic resin material is used as the filter 43, the holes 43a will widen and the dust removal function of the filter 43 will gradually decline with the use of the ink jet head 1 because of abrasion of the filter 43 due to ink passing through the holes 43a, or the corrosion of the filter 43 due to ink. However, in the present embodiment, the filter 43 is formed with a ceramic material having good anti-abrasion properties and anti-corrosion properties. Because of that, it will be difficult for the holes 43a to become enlarged due to abrasion and corrosion, and thus the rate of decline in the dust removal function will be small, and the filter 43 will have a long life. The method in which the filter 43 is manufactured will be described in detail below.

Next, the piezoelectric actuator 3 will be described. As shown in FIGS. 3 and 4, the piezoelectric actuator 3 has the oscillation plate 30, a piezoelectric layer 31 that is formed on the upper surface of the oscillating plate 30, and a plurality of individual electrodes 32 that are formed on the upper surface of the piezoelectric layer 31. As shown in FIG. 2, the individual electrodes 32 are formed in positions which correspond to the respective plurality of pressure chambers 14 of the flow path unit 2.

The oscillation plate 30 is a metallic plate, and serves as a common electrode that faces the plurality of individual electrodes 32 and creates an electric field in the piezoelectric layer 31 between the individual electrodes 32 and the oscillation plate 30. The oscillation plate 30 is grounded and maintained in the ground state.

The piezoelectric layer 31 is formed on the upper surface of the oscillation 30, and the primary component thereof is lead zirconate titanate (PZT) which is a solid solution of lead titanate and lead zirconate and is also a ferroelectric substance.

The individual electrodes 32 are plate shaped members composed of a conductive material, and as shown in FIG. 2, have a flat oval shape that is slightly smaller than the pressure chambers 14. In the plan view of FIG. 2, the plurality of individual electrodes 32 is respectively arranged in regions which face the central portions of the corresponding pressure chambers 14. Furthermore, terminals 35 are formed on the ends of the individual electrodes 32. As shown in FIG. 4, the terminals 35 are electrically connected to a driver IC 37 via flexible wiring members (not shown in the figures) such as a flexible print wiring board and the like, and a drive voltage is selectively applied from the driver IC 37 to the plurality of individual electrodes 32 via the terminals 35.

Next, the operation of the piezoelectric actuator 3 will be described. When a drive voltage is selectively applied from the driver IC 37 to the plurality of individual electrodes 32, the electric potential of the individual electrodes 32 to which the drive voltage is applied will be different than the electric potential of the oscillation plate 30 maintained in the ground state, and an electric field will be produced in the vertical direction of FIG. 4 in the piezoelectric layer 31 interposed between the individual electrodes 32 and the oscillation plate 30. By creating an electric field, the piezoelectric layer 31 will polarized in the vertical direction of FIG. 4, and will contract in a direction perpendicular to the polarization direction. With the contraction of the piezoelectric layer 31, bending will be effected in the oscillation plate 30, and the oscillation plate 30 will deform so as to be convex on the pressure chamber 14 side. The capacity inside the pressure chambers 14 will be reduced, the ink inside the pressure chambers 14 will be pressurized, and the ink will be ejected from the nozzles 20 that communicate with the pressure chambers 14.

Next, a method of manufacturing the filter 43 made of ceramic will be described with reference to FIG. 5.

Figure 5A:
FIG. 5 (a) shows forming a resist pattern on a second substrate according to an embodiment of the method for manufacturing a filter.

First, as shown in FIG. 5(a), a photo-resist pattern 51 is formed on one side of a second substrate 50. A conductive material such as stainless steel, a silicon wafer, and the like is employed as the second substrate 50. The photo-resist pattern 51 is formed on the portions in which one wants holes to be formed in a first substrate 52.

Figure 5B:
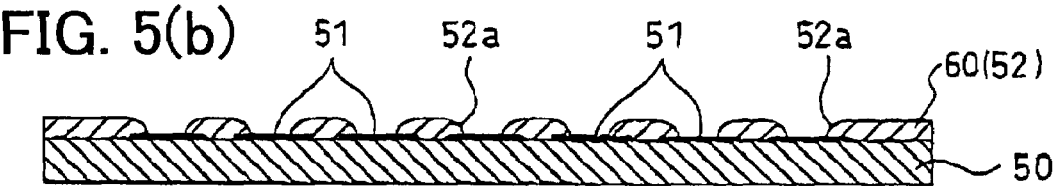

Next, as shown in FIG. 5(b), electro deposition is performed on the second substrate 50. A metal such as nickel, copper, or the like is deposited on the portions in which the photo-resist pattern 51 is not formed. In this way, a metal layer 60 having a plurality of holes 52a will be formed on the second substrate 50.

Figure 5C:
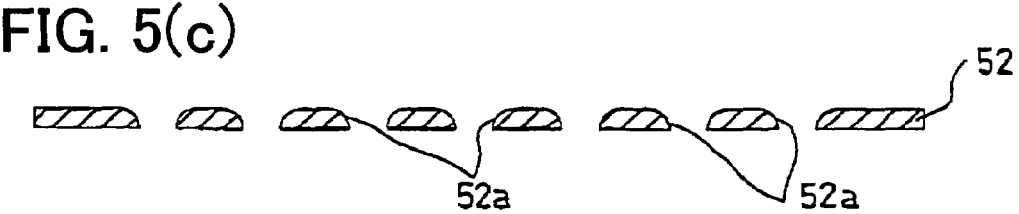

Next, as shown in FIG. 5(c), the second substrate 50 and the photo-resist pattern 51 will be removed from the metal layer 60, and the first substrate 52 will be obtained. As noted above, by employing an electro deposition method in which the photo-resist pattern 51 was used, a first substrate 52 having extremely small holes 52a of about 10 μm in diameter can be easily produced.

Figure 5D:
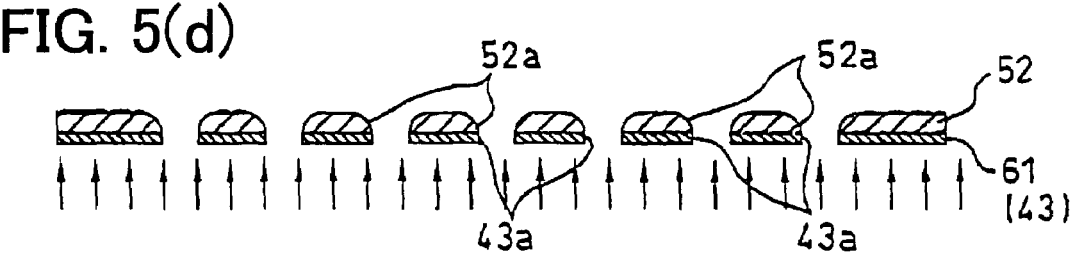

Next, as shown in FIG. 5(d), particles of a ceramic material such as alumina, zirconia, silicon nitride, silicon carbide, and the like will be deposited on the surface of the first substrate 52 (the metal layer 60) from which the second substrate 50 was removed, and a ceramic layer 61 will be formed. For example, the ceramic layer 61 can be formed by an aerosol deposition method (AD method) that sprays extremely small particles of ceramic material mixed with a carrier gas onto the substrate 52 to cause them to collide therewith at a high speed, and thereby be deposited on the first substrate 52. Or, a sputtering method or a chemical vapor deposition method (CVD method) can be employed to form the ceramic layer 61. In this way, an extremely thin ceramic layer 61 having a thickness of about 5-10 μm can be formed.

The plurality of holes 52a are formed in the first substrate 52 (metal layer 60), and particles of ceramic material will not be deposited in the positions of these holes. Thus, the ceramic layer 61 that is formed has holes 43a that are formed in the positions that correspond to the holes 52a of the first substrate 52.

Figure 5E:
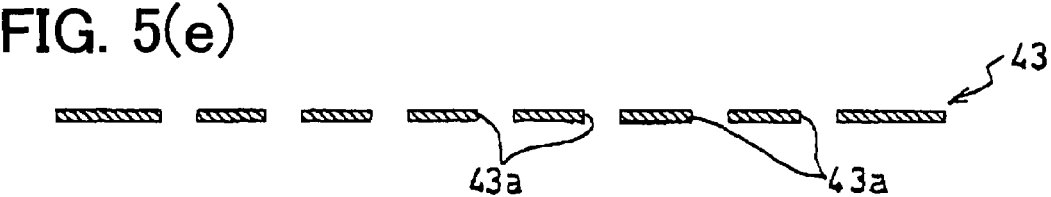

Finally, as shown in FIG. 5(e), the first substrate 52 (metal layer 60) is removed from the ceramic layer 61 by etching with hydrochloric acid or the like to obtain the filter 43. The ceramic layer 61 is heated to a high temperature at which the particles of the ceramic material will be sintered. The first substrate 52 may be removed before heating or after heating the ceramic layer 61.

According to the method for manufacturing the filter 43, a filter 43 will be obtained that is composed of ceramic materials that have both excellent anti-abrasion properties and anti-corrosion properties with respect to ink. It will be difficult for enlargement of the holes 43a of the filter 43 to occur due to abrasion or corrosion. It will be difficult for the dust removal function of the filter 43 to decline, and thus the filter 43 will have a long life. In addition, the filter 43 can be easily manufactured, and the manufacturing costs will be low.

Because the hardness of ceramic material is high, it will be extremely difficult to perform a mechanical process such as a drill process or the like on a ceramic plate. According to the method for manufacturing the filter of the present embodiment, a ceramic layer 61 having a plurality of holes 43a can be easily formed on the smooth surface of the metal layer 60 having a plurality of holes 52a, by forming a ceramic layer 61 by the AD method, the sputtering method or the CVD method.

By employing the AD method, the sputtering method, or the CVD method, an extremely thin ceramic layer 61 can be formed. In the aforementioned method for manufacturing, after the ceramic layer 61 was formed, the overall thickness of the filter 43 can be further reduced by removing the metal layer 60 from the ceramic layer 61. The filter 43 produced in this way will have an extremely small flow resistance (pressure drop) when ink passes therethrough.

In particular, when air bubbles that have a harmful impact on ink discharge operations are mixed into the individual ink flow paths 21 which include the pressure chambers 14 (see FIG. 4), the ink will be forcibly pressurized and discharged together with the air bubbles from the nozzles 20. In other words, although it will be necessary to perform a purge operation, the air bubbles will become easier to discharge when the pressure drop of the ink is small in the filter 43 because the speed of the ink that is discharged from the nozzle 20 will increase.

Next, modified examples will be described in which various modifications were added to the aforementioned embodiment. However, portions having the same composition as the aforementioned embodiment will be referred to with the same reference numerals, and descriptions thereof will be appropriately omitted.

MODIFICATION EXAMPLE 1

Figure 7A:
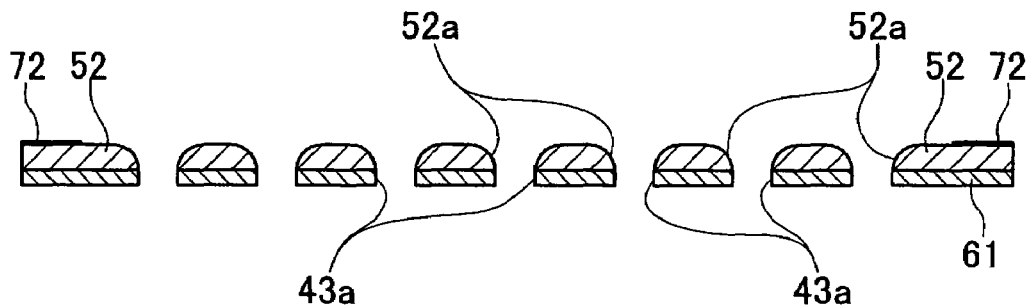
FIG. 7 (a) shows forming a mask according to another modified embodiment of the method for manufacturing a filter.
Figure 7B:
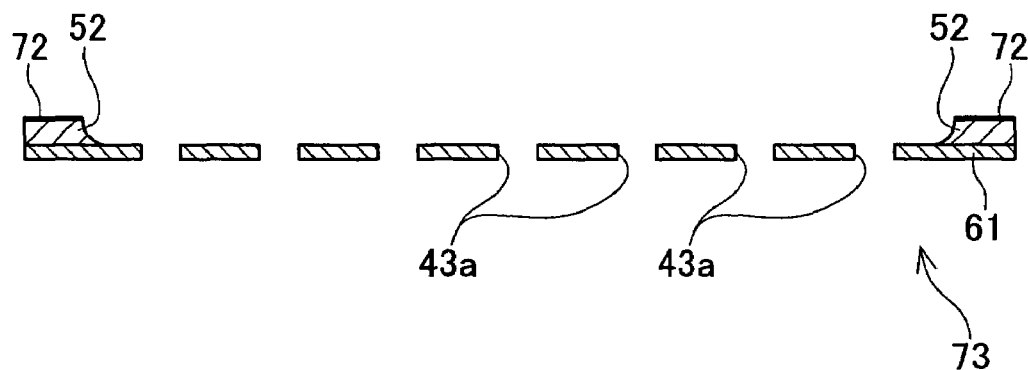
Figure 7C:
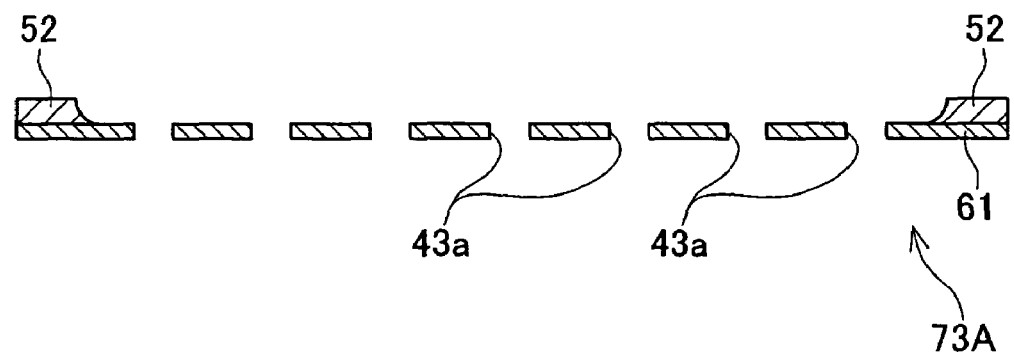

In the aforementioned embodiment, after the first substrate 52 (metal layer 60) was used to form the ceramic layer 61, the whole of the first substrate 52 is removed from the ceramic layer 61. However, it is possible that only the central part of the first substrate 52 is removed and the peripheral part of the first substrate 52 is left. As shown in FIG. 5 (d), the ceramic layer 61 may be formed on a smooth surface (bottom surface)

of the first substrate 52, and then as shown in FIG. 7(a), a mask 72 is formed on the other surface (upper surface) of the first substrate 52. The mask 72 is formed so that only the peripheral part of the first substrate 52 is covered by the mask 72. Next, as shown in FIG. 7(b), the first substrate 52 is etched. The central part of the first substrate 52, on which the mask 72 is not formed, is removed from the ceramic layer 61. In this case, a filter 73 of which the peripheral part is reinforced with a stiff metallic frame can be obtained. The filter 73 is difficult to break, and is easy to handle for fitting within the ink jet head 1. In addition, as shown in FIG. 7(c), it is also possible to remove the mask 72 after removing the central part of the first substrate 52.

MODIFICATION EXAMPLE 2

In the aforementioned embodiments, after the first substrate 52 (metal layer 60) was used to form the ceramic layer 61, the first substrate 52 is removed from the ceramic layer 61. However, removing the first substrate 52 may be omitted. In this case, the thickness of the entire filter increases because of the thickness of the first substrate 52. However, a layer of ceramic material whose durability is generally low can be reinforced by means of the first substrate 52 composed of a metallic material such as nickel, copper, or the like, and thus the strength of the filter will improve.

MODIFICATION EXAMPLE 3

As shown in FIG. 6(a), a ceramic layer 70 may be formed on a smooth surface (bottom surface) of the first substrate 52, and then as shown in FIG. 6(b), the entire first substrate 52 may be coated with the ceramic layer 70 by depositing a ceramic material on another surface (upper surface) of the first substrate which has assumed a slightly rounded shape and on the inner surface of the holes 52a. In this case, because the entire first substrate 52 that is made of metal having a high degree of strength is coated with the ceramic layer 70 having good anti-abrasion properties and anti-corrosion properties, a filter 43A can be obtained that has both excellent anti-abrasion and anti-corrosion properties, and a high degree of strength.

MODIFICATION EXAMPLE 4

The aforementioned embodiment is an example in which the present invention was applied to a filter of an ink jet head, however because the anti-corrosion properties of the filter of the present invention are high, the filter can be used in various devices that use various fluids other than ink which contain corrosive fluid (not only fluids such as water and the like, but also gases such as air and the like).

The invention claimed is:

1. A method for manufacturing a filter, comprising:
    forming a first substrate comprising a plurality of through holes; and
    depositing particles of ceramic material directly on a front surface of the first substrate to form a ceramic layer comprising a plurality of through holes corresponding to the plurality of through holes of the first substrate,
    wherein the particles of ceramic material are not deposited in positions of the plurality of through holes of the first substrate so that each of the through holes of the ceramic layer is formed to align with a corresponding through hole of the first substrate.

2. The method of claim 1, further comprising depositing particles of ceramic material on a back surface of the first substrate to form an additional ceramic layer.

3. The method of claim 1, further comprising removing the first substrate from the ceramic layer after the depositing particles of ceramic material to form the ceramic layer is performed.

4. The method of claim 3,
    wherein only a central part of the first substrate is removed from the ceramic layer and a peripheral part of the first substrate is not removed from the ceramic layer.

5. The method of claim 4,
    wherein removing the first substrate from the ceramic layer comprising:
        covering the peripheral part of the first substrate at a back surface by a mask; and
        removing the central part of the first substrate from the ceramic layer by etching.

6. The method of claim 1,
    wherein the ceramic layer is formed by an aerosol deposition method, a sputtering method, or a chemical vapor deposition method.

7. The method of claim 6,
    wherein the forming the first substrate comprises:
        forming a resist pattern corresponding to the plurality of through holes of the first substrate on a front surface of a second substrate;
        forming a metal layer on the front surface of the second substrate by an electro deposition method; and
        removing the second substrate and the resist pattern from the metal layer to form the first substrate.

8. The method of claim 7, further comprising depositing particles of ceramic material on a back surface of the first substrate to form an additional ceramic layer.

9. The method of claim 7, further comprising removing the first substrate from the ceramic layer after depositing particles of ceramic material to form the ceramic layer is performed.

10. The method of claim 9,
    wherein only a central part of the first substrate is removed from the ceramic layer and a peripheral part of the first substrate is not removed from the ceramic layer in removing the first substrate from the ceramic layer.

11. The method of claim 10,
    wherein removing the first substrate from the ceramic layer comprises:
        covering the peripheral part of the first substrate at a back surface by a mask; and
        removing the central part of the first substrate from the ceramic layer by etching.

* * * * *